United States Patent [19]

Doi et al.

[11] 4,195,124

[45] Mar. 25, 1980

[54] SOLAR RADIATION ENERGY ABSORBER

[75] Inventors: Hiroshi Doi, Katano; Shiyuichiro Ochiai, Ohmihachiman; Shigeyuki Kawai, Takarazuka; Kazuaki Miyamoto; Tadashi Sasaki, both of Mishima, all of Japan

[73] Assignee: Sekisui Kagaku Kogyo Kabushiki Kaisha, Japan

[21] Appl. No.: 789,718

[22] Filed: Apr. 21, 1977

[30] Foreign Application Priority Data

Apr. 26, 1976 [JP] Japan ................................. 51/48143

[51] Int. Cl.$^2$ .............................................. B32B 15/04
[52] U.S. Cl. .................................. 428/469; 106/286.7; 148/6.24; 148/31.5; 156/666; 252/79.5; 252/186; 427/399; 126/417
[58] Field of Search .................. 428/469, 420; 427/54, 427/399, 57; 106/286; 252/186, 79.2, 79.5; 126/270, 271; 148/31.5, 6.24; 423/513, 521; 204/157.1 R, 157.1 S, 157.1 H; 156/666

[56] References Cited

U.S. PATENT DOCUMENTS

| | | | |
|---|---|---|---|
| 1,844,420 | 2/1932 | Buttolph | 204/157.1 R |
| 2,457,493 | 12/1948 | Redfern | 156/335 |
| 2,475,981 | 7/1949 | Newell | 148/6.24 |
| 2,917,817 | 12/1959 | Tabor | 428/469 |
| 3,279,957 | 10/1966 | Fink | 148/6.24 |
| 3,332,882 | 7/1967 | Blumbergs et al. | 252/186 |
| 3,630,866 | 12/1971 | Pelofsky | 204/157.15 |
| 3,726,800 | 4/1973 | Yelin et al. | 252/186 |
| 3,809,588 | 5/1974 | Zeblisky | 156/666 |
| 3,839,098 | 10/1974 | Beckwith | 148/6.24 |
| 3,927,189 | 12/1975 | Jayawant | 423/513 |
| 4,029,853 | 6/1977 | McMahon et al. | 428/469 |

OTHER PUBLICATIONS

Hackh's Chemical Dictionary ©1969 p. 699.
Shanley et al. "Peroxides and Peroxy Compounds", Kirk-Othmer ect., vol. 14 pp. 755–756, ©1967.

*Primary Examiner*—John T. Goolkasian
*Assistant Examiner*—J. J. Gallagher
*Attorney, Agent, or Firm*—Wenderoth, Lind & Ponack

[57] ABSTRACT

A solar energy absorber consisting of a metallic copper or copper alloy substrate and a black to dark brown copper oxide coating on its surface. The copper oxide coating is formed by treating the surface of the substrate with an aqueous alkaline solution containing peroxodisulfuric acid or an inorganic peroxodisulfate. The solution may be activated by adding an oxidizing agent or applying ultraviolet or ultrasonic irradiation.

6 Claims, 1 Drawing Figure

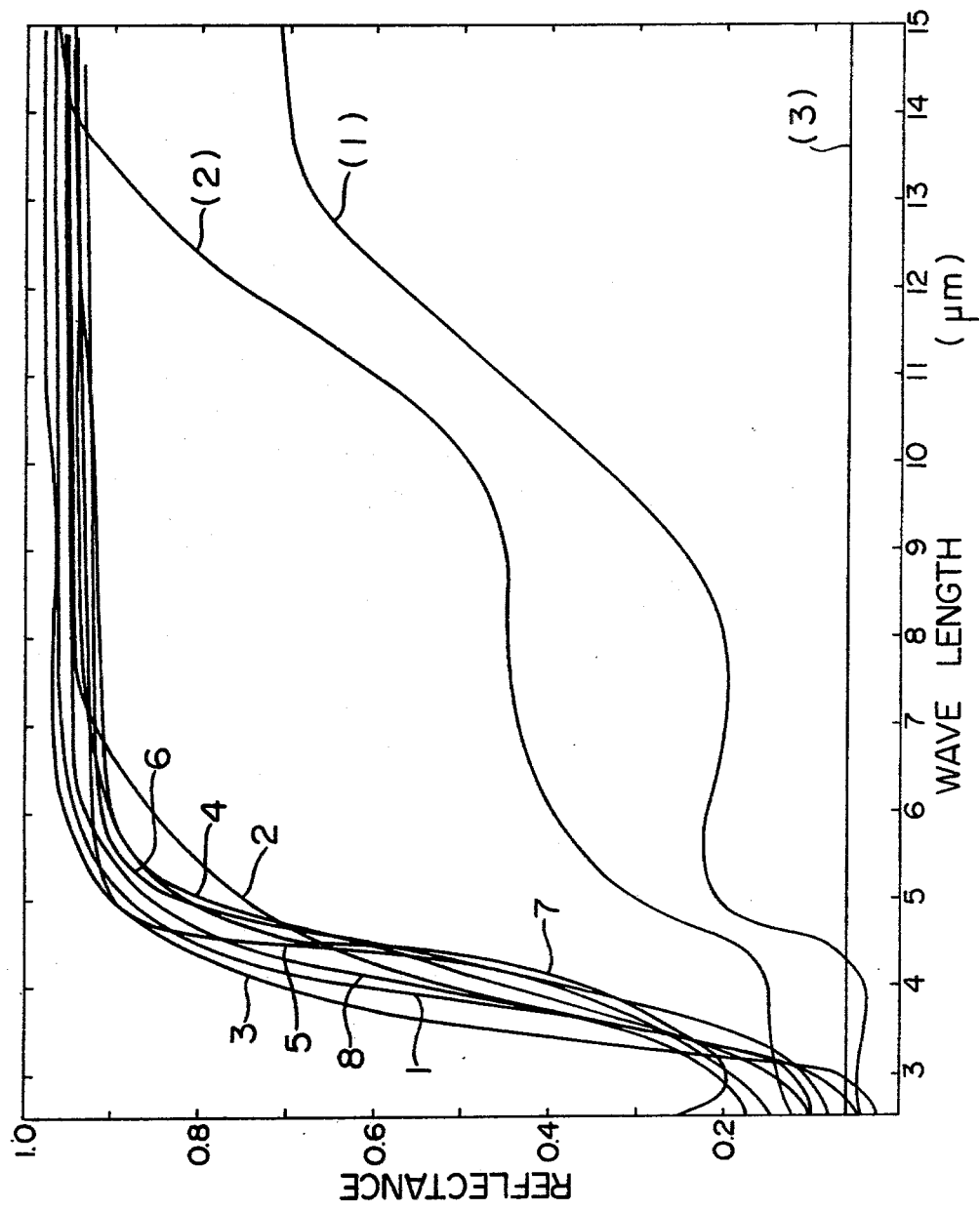

SOLAR RADIATION ENERGY ABSORBER

This invention relates to a solar energy absorber which effectively absorbs solar radiation energy with little radiation of the heat stored.

The solar energy absorber is a device which when exposed to the sunlight, absorbs solar radiation energy and stores it as thermal energy, and permits its effective utilization by transfer to a suitable working fluid such as water or air. The device is applied, for example, to solar water heaters and solar ponds, and may be in a suitable form such as a panel, tube or pillar.

In an absorber for absorbing solar radiation energy and converting it to heat, the critical attainable temperature, or the maximum temperature which can be reached by the absorber while maintaining a balance between thermal absorption and thermal radiation, is generally determined according to the total amount of the heat loss caused by the convection and heat conduction of the air with which the absorber makes contact, and the heat loss caused by radiation of heat from the surface of the absorber into the atmosphere. In absorbers made of various materials having the same surface area, the amount of heat loss due to the convection and heat conduction of the air does not so much depend upon the qualities and kinds of the materials that constitute the absorbers, but is merely proportional to the difference between the temperature of the absorber and the ambient temperature. On the other hand, the amount of heat loss due to thermal radiation into the atmosphere is proportional to the difference between the fourth power of the temperature of the absorber and the fourth power of the ambient temperature, and depends greatly on the material that constitutes the absorber. Accordingly, the difference in the amount of heat loss due to radiation becomes remarkable depending upon the material of the absorber and increases at higher temperatures.

The critical attainable temperature of the absorber, therefore, differs according to the material of the absorber, and is greatly affected by the thermal radiation ability of the absorber. In other words, an absorber made of a material having a low ability of thermal radiation (that is, a material with a small amount of heat loss due to thermal radiation) absorbs solar radiation energy well and attains a high temperature within short periods of time.

The amount of energy thermally radiated from a material is necessarily smaller than the radiation energy caused by radiation from an ideal black body (namely a body which completely absorbs radiated electromagnetic waves irrespective of their wavelengths) kept at the same temperature as the material. The ratio of the former to the latter is termed "thermal emittance," and the heat radiating ability of a material is expressed in terms of thermal emittance. The sunlight consists mostly of electromagnetic waves in the visible and near infrared regions, whereas electromagnetic waves thermally radiated from a body are distributed in the infrared region. Accordingly, the solar energy absorber is required to absorb electromagnetic waves well, in the visible and near infrared regions without radiating electromagnetic waves in the infrared region, and readily attain high temperatures.

Heretofore, a structure consisting of a substrate of a metallic material whose surface is merely painted black with a pigment or the like, and a black-colored shaped plastic structure, for example, have been used as a solar energy absorber in solar water heaters or the like. These absorbers, however, undergo peeling of the coating due to the deterioration of the coated surface, or have insufficient durability characteristics such as weatherability or thermal stability. Solar energy absorbers blackened in such a manner are very similar to an ideal black body in thermal radiating ability, and therefore, absorb electromagnetic waves well, in the visible and near infrared regions, which account for a greater portion of the sunlight. But at the same time, they have a great ability of thermal radiation in the infrared region, and cause great heat losses due to radiation, not to say of heat losses cause by heat conduction into the air or other media. When such a solar energy absorber is used in a solar water heater, it is difficult to obtain a great quantity of high temperature water with high efficiency.

In an attempt to remove this defect, some "selective" solar energy absorbers which absorb electromagnetic waves well, in the visible and near infrared regions, and undergo extremely low heat loss by radiation from their surface have been suggested. They include, for example, an absorber consisting of a metallic copper substrate whose surface is blackened by oxidation with a concentrated solution of sodium chlorite and sodium hydroxide, and an absorber consisting of a copper or aluminum substrate on which a nickel-zinc alloy is deposited by electrodeposition in a solution containing ammonium thiocyanate and simultaneously converted to a sulfide. Production of the first-mentioned selective absorber, however, requires temperatures of as high as 130° C. or more. Moreover, side-reactions tend to take place because of the use of unstable sodium chlorite, and a uniform coating is difficult to form on the surface of the substrate. Hence, the ability of the absorber to absorb electromagnetic waves and radiate heat is unstable, and chlorine gas is evolved during the treatment of the spent treating solution. On the other hand, in the case of the latter-mentioned selective absorber, the substrate must be pre-treated very strictly in order to electrodeposit the alloy in intimate adhesion to the surface of the substrate. Thus, the result of the pretreatment affects the ability of the deposited coating to absorb solar radiation energy and radiate heat energy, and it is difficult to obtain uniform quality.

It is an objective of this invention to remove the defects of the conventional solar radiation energy absorbers, and to provide a selective solar energy absorber which effectively absorbs solar radiation energy with little radiation of the heat stored.

In order to discover such a solar energy absorber, the present inventors extensively worked on substrates and methods for their surface treatment. The work led to the discovery that treatment of the surface of a substrate consisting of copper or a copper alloy with a specified treating solution affords a black to dark brown coating with good adhesion, and forms a selective solar energy absorber which effectively absorbs solar radiation energy with little radiation of the heat stored.

The essence of the present invention lies in (1) a solar radiation energy absorber consisting of a copper or copper alloy substrate whose surface has been treated with an aqueous solution containing peroxodisulfuric acid or its salt; and (2) a solar radiation energy absorber consisting of a copper or copper alloy substrate whose surface has been treated with an activated aqueous alkaline solution containing peroxodisulfuric acid or its salt.

The material for the substrate in accordance with this invention is metallic copper or a copper alloy. Examples of the copper alloy are alloys of copper with such an element as zinc, tin, nickel, silicon, chromium, iron, beryllium, titanium, antimony, phosphorus, cadmium, zirconium, or cobalt. Preferably, the copper content in the alloy is at least 50% by weight.

The treating solution for the surface of the substrate is an aqueous alkaline solution containing peroxodisulfuric acid, or its inorganic salt. The alkaline compound used to prepare the treating solution is an alkali metal hydroxide or carbonate, and for example, sodium hydroxide, potassium hydroxide, and sodium carbonate can be suitably used. Examples of the peroxodisulfate are alkali metal peroxodisulfates and ammonium peroxodisulfate. Sodium peroxodisulfate and potassium peroxodisulfate are especially preferred. The treating solution can be prepared by adding at least one of peroxodisulfuric acid or its salts to an aqueous solution containing at least one of the alkaline compounds. If peroxodisulfuric acid is used, it becomes the corresponding alkali metal salt in the aqueous alkaline solution. Unless the treating solution is alkaline, it does not actively work on the surface of the copper or copper alloy substrate. Moreover, since the peroxodisulfate decomposes generally to a high degree in acidic solutions, the treating solution should be alkaline, and preferably strongly alkaline. The aqueous alkaline solution suitably contains 1 to 25% by weight, preferably 3 to 10% by weight, based on the weight of water, of the alkaline compound.

If the amount of the peroxodisulfuric acid or its salt contained in the treating solution is too small, the treating ability of the treating solution decreases, and a longer treating time and a higher treating temperature are required. If it is too large, the rate of reaction increases excessively, and consequently, the thickness of the resulting coating rather decreases. Moreover, nonuniformity of treatment occurs, and the treating time is too short to be properly controlled. Accordingly, the amount of the peroxodisulfuric acid or its salt is preferably 0.1 to 50% by weight, especially preferably 0.5 to 10% by weight, based on the weight of the aqueous alkaline solution.

Treatment of the surface of the copper or copper alloy substrate is performed by contacting the treating solution at a suitable temperature with the surface of the substrate by suitable means such as dipping or spraying. As a result, a black to dark brown copper oxide coating is formed on the substrate surface within relatively short periods of time. The coated substrate is then washed with water to remove the treating solution adhering to it, and then dried. The coating consists mostly of cupric oxide and contains a small amount of cuprous oxide.

The suitable temperature of the treating solution is from room temperature to 100° C., and especially preferred temperatures are 40° to 80° C. Since the treating solution is an aqueous solution, a great quantity of water evaporates at a temperature exceeding 100° C., and the efficiency of treatment is worsened. On the other hand, when the temperature of the solution is below 40° C., the treating time required increases. When the temperature of the treating solution is 40° to 80° C., treating periods of as short as 1 to 20 minutes are sufficient, and longer treating periods scarcely affect the thickness of the coating obtained. Thus, it has been found that the thickness of the copper oxide coating formed on the substrate surface is 0.2 to 0.6 micron, and a solar energy absorber having a copper oxide coating with a thickness within this range exhibits superior properties intended. In other words, it has been found that when a treating solution containing the aforesaid components in the specified concentrations is contacted with the surface of a copper or copper alloy substrate at a temperature of 40° to 80° C. for relatively short periods of time, a copper oxide coating having a thickness of about 0.2 to 0.6 micron is formed on the substrate surface, thus giving a good solar energy absorber. When the thickness of the coating is smaller than 0.2 micron, the ability of the absorber to absorb solar radiation energy, i.e. absorptance, is low, and if it is larger than 0.6 micron, the amount of the energy that has been radiated after absorption, i.e. emittance, is large. Preferably, the thickness of the copper oxide coating is about 0.4 micron. The thickness of the coating can be optically measured. If it is desired to obtain a coating having the desired thickness, the suitable concentration and temperature of the treating solution and the suitable treating time can be predetermined within the above specified ranges by conducting preliminary tests.

The present inventors also found that when the treating solution is activated by adding a small amount of an oxidizing agent such as potassium chromate or potassium peroxide to it or applying ultraviolet or ultrasonic irradition to it during the treatment, the speed of forming the coating increases, and the treating temperature can be made lower. Activation of the treating solution in this manner makes it possible to obtain good results within short periods even at a temperature below 40° C. The amount of the oxidizing agent as an additional ingredient is about 5% based on the weight of the peroxodisulfuric acid or its salt.

Experiments of the present inventors show that solar energy absorbers obtained as a result of the surface treatment described above have a high absorptance for electromagnetic waves in the visible and near infrared regions and a good absorptance for solar radiation energy, and undergo little heat losses due to radiation because they have a low emittance in the infrared region.

It has also been confirmed that these solar radiation energy absorbers can be conveniently used in solar water heaters, for example, because thermal energy is stored within short periods of time to attain high temperatures which can be retained over long periods of time, and the solar radiation energy absorbed can be utilized effectively.

Only that part of the substrate surface which is desired can be treated, and the unwanted parts can be suitably covered to avoid contact with the treating solution. The copper oxide coating formed does not peel off from the substrate surface, and has superior durability suitable for use in solar energy absorbers.

The following examples illustrate the present invention in greater detail.

EXAMPLE 1

Sodium hydroxide (50 g) and 20 g of potassium peroxodisulfate were dissolved in 1 liter of water to form a treating solution. The treating solution was maintained at 80° C., and a pure copper plate (purity 99.9%) having a width of 5 cm, a length of 6 cm and a thickness of 0.3 mm was dipped in it for 1 minute, whereupon a black copper oxide coating was formed.

The copper plate was thoroughly washed with water, and dried to afford a solar energy absorber.

EXAMPLE 2

The same treating solution as used in Example 1 was maintained at 70° C., and a bronze plate (Sn 5%, P 0.4%) having a width of 5 cm, a length of 6 cm and a thickness of 0.3 mm was dipped in it for 5 minutes. The plate was washed thoroughly with water, and dried to afford a solar energy absorber. The thickness of the black copper oxide coating formed on the surface of the bronze plate was optically measured, and found to be about 0.4 micron.

EXAMPLE 3

The same treating solution as used in Example 1 was maintained at 40° C., and the same pure copper plate as used in Example 1 was dipped in it for 15 minutes. The plate was thoroughly washed with water, and dried to afford a solar energy absorber.

EXAMPLE 4

The same treating solution as used in Example 1 was maintained at 40° C., and the same pure copper plate as used in Example 1 was dipped in it for 5 minutes under the irradiation of a 100W mercury lamp. The plate was thoroughly washed with water, and dried to afford a solar energy absorber. The thickness of the oxide coating formed was about 0.25 micron.

EXAMPLE 5

The same treating solution as used in Example 1 was maintained at 40° C., and the same pure copper plate as used in Example 1 was dipped in it for 5 minutes under the application of ultrasonic waves at 28 KHz. The coating was thoroughly washed with water, and dried to give a solar energy absorber.

EXAMPLE 6

Sodium hydroxide (50 g), 20 g of potassium peroxodisulfate and 1 g of potassium chromate were dissolved in 1 liter of water to form a treating solution. The treating solution was maintained at 40° C., and the same pure copper plate as used in Example 1 was dipped in it for 7.5 minutes. The plate was washed thoroughly with water, and dried to afford a solar energy absorber.

EXAMPLE 7

Sodium hydroxide (50 g) and 10 g of potassium peroxodisulfate were dissolved in 1 liter of water to form a treating solution. The treating solution was maintained at 50° C., and the same pure copper plate as used in Example 1 was dipped in it for 15 minutes. The plate was washed thoroughly with water, and dried to afford a solar energy absorber. The thickness of the resulting copper oxide coating was about 0.4 micron.

EXAMPLE 8

Sodium hydroxide (50 g) and 10 g of sodium peroxodisulfate were dissolved in 1 liter of water to form a treating solution. The treating solution was maintained at 50° C., and the same pure copper plate as used in Example 1 was dipped in it for 15 minutes. The plate was thoroughly washed with water, and dried to afford a solar energy absorber.

COMPARATIVE EXAMPLE 1

Sodium hydroxide (100 g) and 50 g of sodium chlorite were dissolved in 1 liter of water to form a treating solution. The treating solution was maintained at 130° C., and the same pure copper plate as used in Example 1 was dipped in it for 15 minutes. The plate was washed thoroughly with water and dried to afford a solar energy absorber.

COMPARATIVE EXAMPLE 2

The same treating solution as used in Comparative Example 1 was maintained at 90° C., and the same pure copper plate as used in Example 1 was dipped in it for 45 minutes. The plate was washed thoroughly with water, and dried to afford a solar energy absorber.

COMPARATIVE EXAMPLE 3

The outside surface of the same pure copper plate was coated with a standard black paint ("NEXTEL BLACK," trademark for an epoxy resin/carbon black type paint made by Minnesota Mining & Mfg. Co.) to afford a solar energy absorber.

The absorbers prepared in the above examples were tested for various properties as shown below.

The absorptance of each absorber in the ultraviolet, visible and near infrared regions was determined by measuring its near-normal ($\theta = 8°$) hemispherical reflectance by a spectrophotometer using an integrating sphere attachment and magnesium oxide as a reference Standard. The results are given in Table 1.

Table 1

| Absorber | Absorptance |
|---|---|
| Example 1 | 0.94 |
| Example 2 | 0.90 |
| Example 3 | 0.90 |
| Example 4 | 0.91 |
| Example 5 | 0.90 |
| Example 6 | 0.94 |
| Example 7 | 0.90 |
| Example 8 | 0.91 |
| Comparative Example 1 | 0.88 |
| Comparative Example 2 | 0.80 |
| Comparative Example 3 | 0.95 |

The results shown in Table 1 demonstrate that the solar energy absorbers of this invention have an absorptance equivalent or superior to the conventional selective absorber treated with a chlorite solution, and comparable to that of the absorber coated with a black paint.

The thermal emittance of each of the solar energy absorbers was measured at 50° C., 100° C. and 150° C., and the results are given in Table 2.

The measurement of emittance was performed in the following manner. An emissometer was used, and a temperature detector was provided between a high temperature-side standard heat source and a low temperature-side standard heat source. At this time, both surfaces of the temperature detector and the surface of the low temperature-side standard heat source were treated with a black paint so that their absorptance equals their emittance and is 1. A sample at each of the specified temperatures was mounted on the surface of the high temperature-side heat source, and the assembly was placed in a high vacuum space substantially free from heat conduction. Twenty-four hours later, the temperatures of the high temperature side heat source, the temperature detector, and the low temperature side heat source, i.e. $T_1$, $T_2$ and $T_3$ respectively, were measured. The emittance ($\epsilon$) of the sample was calculated in accordance with the following equation.

$$\epsilon = T_2^4 - T_3^4 / (T_1^4 - T_2^4)$$

Table 2

| Absorber | Thermal emittance | | |
|---|---|---|---|
| | 50° C. | 100° C. | 150° C. |
| Example 1 | 0.12 | 0.13 | 0.14 |
| Example 2 | 0.15 | 0.14 | 0.14 |
| Example 3 | 0.11 | 0.10 | 0.12 |
| Example 4 | 0.13 | 0.13 | 0.14 |
| Example 5 | 0.16 | 0.16 | 0.15 |
| Example 6 | 0.11 | 0.12 | 0.11 |
| Example 7 | 0.11 | 0.13 | 0.13 |
| Example 8 | 0.10 | 0.10 | 0.11 |
| Comparative Example 1 | 0.36 | 0.36 | 0.35 |
| Comparative Example 2 | 0.43 | 0.44 | 0.42 |
| Comparative Example 3 | 0.39 | 0.91 | 0.91 |

It is seen from Table 2 that the thermal emittances of the solar energy absorbers of the invention at 50° to 150° C. are far lower than those of the comparative absorbers, and the absorbers of the invention can retain high temperatures over long periods of time.

The spectral reflectances of the solar energy absorbers in the infrared region with a wavelength of 2.5 to 15 $\mu$m were measured at an incidence angle of 30° by means of an infrared spectrophotometer with an attachment for measuring reflection spectra. The results obtained were plotted in FIG. 1 accompanying this application. The numbers attached to the curves in the graph refer to those of Examples, and the parenthesized numbers refer to those of Comparative Examples.

The Kirchhoff's law teaches that in a non-transparent material, there is a relation $\alpha = \epsilon = 1 - \gamma$ wherein $\alpha$ is the absorptance, $\epsilon$ is the emittance, and $\gamma$ is the reflectance, at a certain wavelength $\lambda$. This means that a material having a high reflectance has a low emittance. Usually, electromagnetic waves thermally radiated from the surface of a material at about 100° C. are distributed in the infrared region with a wavelength of 5 to 8 $\mu$m.

The FIGURE shows that the solar energy absorbers of the present invention have a reflectance of about 0.9 or more at a wavelength of about 6 $\mu$m. This means that there is very little or no thermal radiation from the absorbers at about 100° C. It is evident therefore that the solar energy absorbers of the present invention absorb solar radiation energy well, with little thermal radiation, and therefore, have a superior efficiency of thermal absorption as compared with the conventional absorbers.

An iron Constantan thermocouple was bonded to the center of the back surface of each solar energy absorber. A 500W Color Flad Lamp (trademark for Matsushita Electric Co., Ltd.) having a color temperature of 5500° K was set at such a position as would produce a radiation energy of 1.0 cal/cm².min., and radiation was performed under the same conditions as in the case of the sunlight. The rate of temperature increase at the back surface of the absorber was measured. The results are shown in Table 3.

Table 3

| Irradiation time (min.) Absorber | Rate of temperature increase (°C.) | | | | | |
|---|---|---|---|---|---|---|
| | 1 | 3 | 5 | 10 | 15 | 20 |
| Example 2 | 29.0 | 59.2 | 75.0 | 92.7 | 100.3 | 104.7 |
| Example 7 | 30.7 | 58.0 | 72.3 | 89.7 | 99.5 | 103.0 |
| Comparative Example 2 | 30.5 | 57.0 | 72.0 | 88.0 | 96.0 | 100.0 |
| Comparative Example 3 | 28.5 | 52.0 | 70.5 | 82.8 | 92.0 | 96.7 |

Table 3 demonstrates that the rates of temperature increase of the solar energy absorbers of the present invention are very fast. It will be readily understood from this that the solar energy absorbers of this invention attain high temperatures faster than do the conventional solar energy absorbers, and the temperatures attained are higher.

It will be appreciated from the above description that when the surface of the substrate is treated with the aqueous alkaline solution containing peroxodisulfuric acid or its salt, the adhesion between the surface coating and the substrate is extremely good. In addition, the solar energy absorber is easy to produce, and has high safety. It has better thermal stability, weatherability and durability than conventional plastic absorbers, and permits a high efficiency of heat exchange with a heat transfer fluid. When the substrate surface is treated with a treating solution having the same composition but being activated, the rate of forming the coating is high, with the result that the treating temperature can be lowered and the efficiency of treatment increases.

Since the solar energy absorber of this invention has a great ability to absorb solar radiation energy with little thermal radiation, heat energy is stored within short periods of time, and high temperatures can be attained. Furthermore, because of its low thermal radiation, the high temperatures reached can be maintained over long periods of time, and the solar radiation energy can be utilized very effectively.

What we claim is:

1. A selective solar energy absorber consisting of a metallic copper or copper alloy substrate and a permanent black to dark brown copper oxide coating having a thickness of 0.2 to 0.6 microns on its surface, said coating having been produced by dipping the substrate in an aqueous alkaline solution consisting essentially of 3 to 10% by weight, based on the weight of water, of an alkali metal hydroxide or an alkali metal carbonate and 0.5 to 10% by weight, based on the weight of the aqueous alkaline solution of at least one member selected from the group consisting of peroxodisulfuric acid, alkali metal peroxodisulfate and ammonium peroxodisulfate, at a temperature of from 40° C. to 80° C. for a period of from 1 minute to 20 minutes.

2. The selective absorber of claim 1 wherein the aqueous alkaline solution is activated to decrease the temperature or reduce the treatment time in a blackening reaction of copper or copper alloy.

3. The selective absorber of claim 2 wherein the activation is carried out by applying ultraviolet irradiation to the solution to decrease the temperature or reduce the treatment time in a blackening reaction of copperor copper alloy.

4. The selective absorber of claim 2 wherein the activation is carried out by applying ultrasonic irradiation to the solution to decrease the temperature or reduce the treatment time in a blackening reaction of copper or copper alloy.

5. The selective absorber of claim 2 wherein the activation is carried out by adding an oxidizing agent to the solution.

6. The selective absorber of claim 5 wherein the oxidizing agent is potassium chromate.

* * * * *